US010108075B2

(12) United States Patent
Nomoto

(10) Patent No.: US 10,108,075 B2
(45) Date of Patent: Oct. 23, 2018

(54) IMAGE PROJECTION APPARATUS

(71) Applicant: CANON KABUSHIKI KAISHA, Tokyo (JP)

(72) Inventor: Makoto Nomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/921,071

(22) Filed: Mar. 14, 2018

(65) Prior Publication Data
US 2018/0267393 A1 Sep. 20, 2018

(30) Foreign Application Priority Data

Mar. 15, 2017 (JP) .................................. 2017-049269

(51) Int. Cl.
| | |
|---|---|
| *G03B 21/16* | (2006.01) |
| *F25B 21/02* | (2006.01) |
| *F25D 17/02* | (2006.01) |
| *G03B 33/12* | (2006.01) |
| *G03B 21/20* | (2006.01) |

(52) U.S. Cl.
CPC .............. *G03B 21/16* (2013.01); *F25B 21/02* (2013.01); *F25D 17/02* (2013.01); *G03B 21/204* (2013.01); *G03B 21/2013* (2013.01); *G03B 33/12* (2013.01)

(58) Field of Classification Search
CPC .... G03B 21/005; G03B 21/16; G03B 21/145; H04N 9/315; H04N 9/3102; H04N 9/3144; H04N 9/3194; F25B 21/02
See application file for complete search history.

(56) References Cited

U.S. PATENT DOCUMENTS

| | | | |
|---|---|---|---|
| 8,794,767 B2 | 8/2014 | Yanagisawa et al. | |
| 9,128,361 B2 | 9/2015 | Yanagisawa et al. | |
| 2009/0051880 A1* | 2/2009 | Ito | G02F 1/133385 353/52 |
| 2012/0298339 A1* | 11/2012 | Masuda | G03B 21/16 165/104.33 |

FOREIGN PATENT DOCUMENTS

| | | |
|---|---|---|
| JP | 2009086274 A | 4/2009 |
| JP | 2013164595 A | 8/2013 |
| JP | 2014112258 A | 6/2014 |

* cited by examiner

*Primary Examiner* — Sultan Chowdhury
(74) *Attorney, Agent, or Firm* — Rossi, Kimms & McDowell LLP

(57) ABSTRACT

An image projection apparatus is configured to project light modulated by a plurality of light modulation elements and to display an image. The image projection apparatus includes a heat receiver provided to each of the plurality of light modulation elements, and to provide a heat exchange with the light modulation elements and a heat exchange with liquid, a temperature changer configured to change a temperature of the liquid that flows in the heat receiver, a pump configured to pump in and out the liquid, and a flow path configured to circulate the liquid among the pump, the temperature changer, and the heat receiver. Each temperature changer is provided for each heat changer and is provided between a corresponding heat receiver and another heat changer different from the corresponding heat receiver on the flow path.

11 Claims, 14 Drawing Sheets

IMAGE PROJECTION APPARATUS

BACKGROUND OF THE INVENTION

Field of the Invention

The present invention relates to an image projection apparatus that projects an image using light modulated by a plurality of light modulation elements.

Description of the Related Art

An image projection apparatus needs to cool light modulation elements, such as liquid crystal panels, for receiving high-intensity light from a light source, and to maintain the temperature in an appropriate temperature range such that the light modulation elements can operate with predetermined modulation characteristics. Japanese Patent Laid-Open No. ("JP") 2014-112258 discloses a liquid-cooling system for an image projection apparatus configured to cool the plurality of light modulation elements through the coolant liquid. The liquid-cooling system cools the coolant liquid through a thermoelectric conversion element (Peltier element) when the light modulation elements are not sufficiently cooled by a radiator that radiates the heat from the coolant liquid.

However, in the liquid-cooling system disclosed in JP 2014-112258, the light modulation element arranged on the upstream side in the coolant liquid flow among the plurality of light modulation elements may cause the temperature of the coolant liquid to rise that cools the downstream light modulation elements. Hence, it is difficult to individually control the temperature of each of the light modulation elements. As a result, the image quality of a projected image is influenced by a difference among the modulation characteristics caused by the temperature differences among the plurality of light modulation elements. In addition, the liquid-cooling system disclosed in JP 2014-112258 cools the coolant liquid that has pumped the heat from all of the light modulation elements, by using a thermoelectric conversion element at one location in the flow path. Thus, the thermoelectric conversion element and its surrounding components for improving the efficiency increase the sizes and the liquid-cooling system or the entire image projection apparatus has an increased size.

SUMMARY OF THE INVENTION

The present invention provides an image projection apparatus that has a small liquid-cooling system that can individually control a temperature of each of a plurality of light modulation elements.

An image projection apparatus according to one aspect of the present invention is configured to project light modulated by a plurality of light modulation elements and to display an image. The image projection apparatus includes a heat receiver provided to each of the plurality of light modulation elements, and to provide a heat exchange with the light modulation elements and a heat exchange with liquid, a temperature changer configured to change a temperature of the liquid that flows in the heat receiver, a pump configured to pump in and out the liquid, and a flow path configured to circulate the liquid among the pump, the temperature changer, and the heat receiver. Each temperature changer is provided for each heat changer and is provided between a corresponding heat receiver and another heat changer different from the corresponding heat receiver on the flow path.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
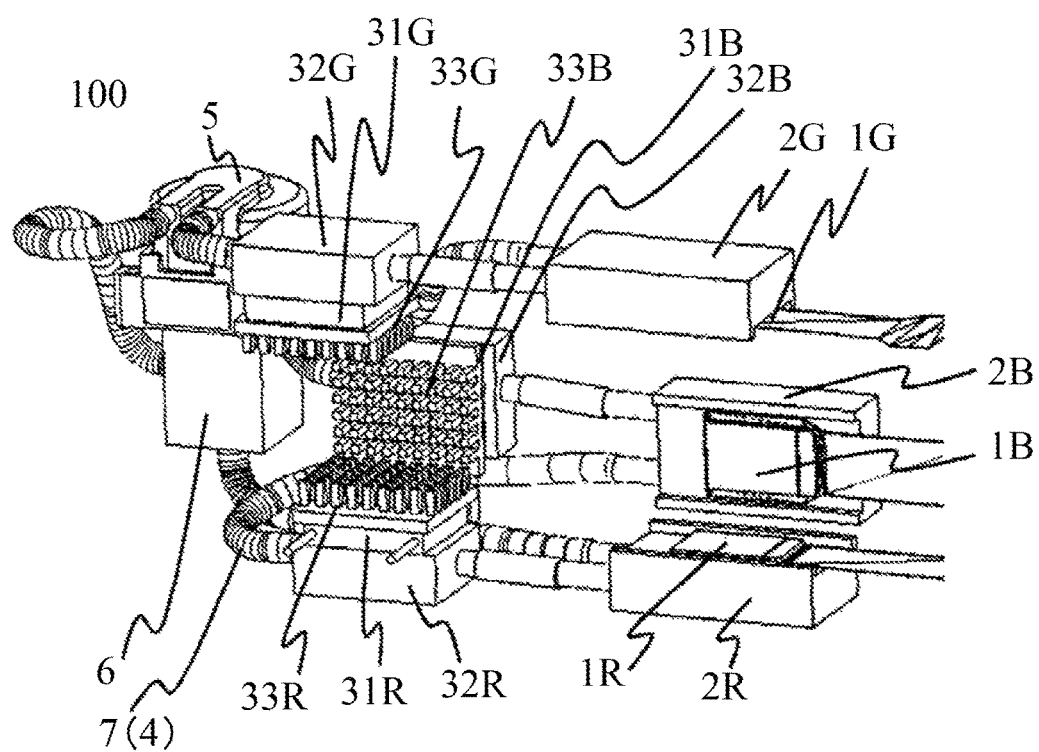
FIG. 1 is an overview of a configuration of a light modulation element liquid-cooling system in a projector according to a first embodiment of the present invention.
Figure 2:
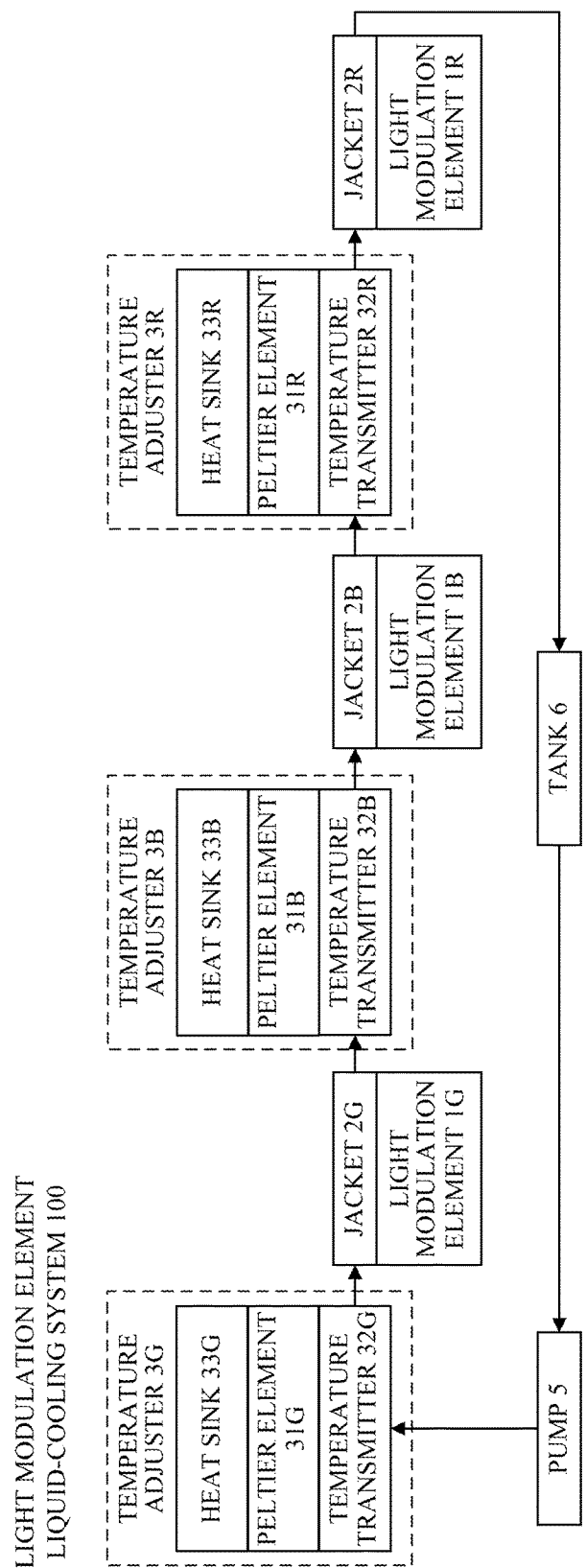
FIG. 2 is a block diagram of a configuration of the liquid-cooling system according to the first embodiment.

FIG. 1 illustrates an external appearance of a light modulation element liquid-cooling system 100 in a projector as an image projection apparatus according to a first embodiment of the present invention. FIG. 2 typically illustrates a configuration of the liquid-cooling system 100.

The liquid-cooling system 100 cools light modulation elements (reflection type liquid crystal elements in this embodiment) configured to reflect and modulate incident light, such as a light modulation element 1R for red (R), a light modulation element 1G for green (G), and a light modulation element 1B for blue (B). These three light modulation elements correspond to first, second, and third light modulation elements.

Jackets 2R, 2G, and 2B as light receivers thermally contact the light modulation elements 1R, 1G, and 1B via grease (not illustrated) as a heat conductive material. The jackets 2R, 2G, and 2B have a metal part formed by a metallic material, such as an aluminum material, a resin part formed by a resin material, and a hollow shape. Coolant liquid 4 as liquid flows in the hollow shape in the jackets 2R, 2G, and 2B. The light modulation elements 1R, 1G, and 1B are arranged on the metal part in the jackets 2R, 2G, and 2B. The metal part has a fin shape, and improves the efficiency of the heat exchange with the coolant liquid 4. These three heat receivers correspond to first, second, and third light receivers.

As illustrated in FIG. 1, an inlet and an outlet for the coolant liquid 4 in each of the jackets 2R, 2G, and 2B have surfaces facing the same directions, located on a side opposite to a side to which a flexible wiring substrate extends for transmitting an electric signal to the light modulation elements 1R, 1G, and 1B.

Temperature adjusters 3R, 3G, and 3B as temperature changers are provided for the jackets 2R, 2G, and 2B (light modulation elements 1R, 1G, and 1B), and adjust (changes or controls) the temperatures of the coolant liquid 4 flowing in the jackets 2R, 2G, and 2B. These three temperature adjusters correspond to first, second, and third temperature adjusters.

The temperature adjusters 3R, 3G, and 3B include Peltier elements 31R, 31G, and 31B as thermoelectric conversion elements, and temperature transmitters 32R, 32G, and 32B as first heat exchangers that provide a heat exchange between the Peltier elements 31R, 31G, and 31B and the coolant liquid 4. Each of the temperature transmitters 32R, 32R, and 32B is made of a metallic material, such as an aluminum material.

In order to improve the operational efficiency of each of the Peltier elements 31R, 31G, and 31B, heat sinks 33R, 33G, and 33B are provided for the Peltier elements 31R, 31G, and 31B as heat exchangers configured to provide heat exchanges with atmospheric air (outside air). Each of the heat sink 33R, 33G, and 33B are provided on a surface opposite to contact surfaces on the Peltier elements 31R, 31G, and 31B with the temperature transmitters 32R, 32G, and 32B. The unillustrated heat conductive sheet material or grease is provided between the Peltier elements 31R, 31G, and 31B, the temperature transmitters 32R, 32G, and 32B, and between the Peltier elements 31R, 31G, and 31B and the heat sinks 33R, 33G, and 33B.

The liquid-cooling system 100 includes a pump 5 for generates a flow of the coolant liquid 4 that pumps in and out the coolant liquid 4, and a tank 6 that stores the coolant liquid 4, and a duct (or a pipe) 7 that forms a flow path (or a channel) used to circulate the coolant liquid 4. The tank 6 has a liquid layer and an air layer for normalizing the state of the coolant liquid 4 in the liquid-cooling system 100 when the coolant liquid 4 vaporizes, expands, and contracts or contains air bubbles, etc.

The coolant liquid 4 circulates in order of the pump 5, the temperature adjuster 3G, the jacket 2G, the temperature adjuster 3B, the jacket 2B, the temperature adjuster 3R, the jacket 2R, the tank 6, and the pump 5 via the duct 7. In other words, in the circulation direction in which the coolant liquid 4 circulates in the flow path, each of the temperature adjusters 3G, 3B, and 3R for the jackets 2G, 2B, and 2R is provided on an upstream side of the corresponding jacket and on a downstream side of the other jackets. In other words, in the flow path, each of the temperature adjusters 3G, 3B, and 3R for the jackets is provided between the jacket corresponding to the temperature adjuster (such as the jacket 2B corresponding to the temperature adjuster 3B) and the other jacket (such as the jacket 2G). Moreover, in the circulation direction, the temperature adjusters 3G, 3B, and 3R, and the jackets 2G, 2B, and 2R are alternated so that the temperature adjuster is located on an upstream side of the corresponding jacket.

In this embodiment, the light modulation element 1G has a heat amount more than that of each of the light modulation element 1B and 1R, and the light modulation element 1R has a heat amount smaller than that of the light modulation element 1B. Set temperatures (predetermined temperature ranges) set for these temperature modulation elements 1G, 1B, and 1R are different from one another, and in higher order of the temperature modulation elements 1G, 1B, and 1R. Since the temperature is set higher in order of G, B, and R in the factory calibration for the optimal optical performance, this temperature order may be maintained in the actual use through the temperature adjusters.

Based on this fact, for miniaturizations and efficiencies for the temperature adjusters 3G, 3B, and 3R, the temperature adjuster 3G, the jacket 2G, the temperature adjuster 3B, the jacket 2B, the temperature adjuster 3R, and the jacket 2R are provided in this order, as described above. Each of the temperature adjuster 3G that adjusts the temperature of the coolant liquid 4 flowing in the jacket 2G, the temperature adjuster 3B that adjusts the temperature of the coolant liquid 4 flowing in the jacket 2B, and the temperature adjuster 3R that adjusts the temperature of the coolant liquid 4 flowing in the jacket 2R are provided on the upstream side of the corresponding jacket. Thereby, the temperatures of the light modulation elements 1G, 1B, and 1R can individually be adjusted to set temperatures (within predetermined temperature ranges). The jacket 2G may have a fin area and a contact area with the coolant liquid 4 wider than those on the jackets 2B and 2R.

Next follows a description of the liquid-cooling system 100 according to this embodiment. In the following description, reference numerals without G, B, and R are commonly applied to components designated by the reference numerals with G, B, and R.

Figure 4:
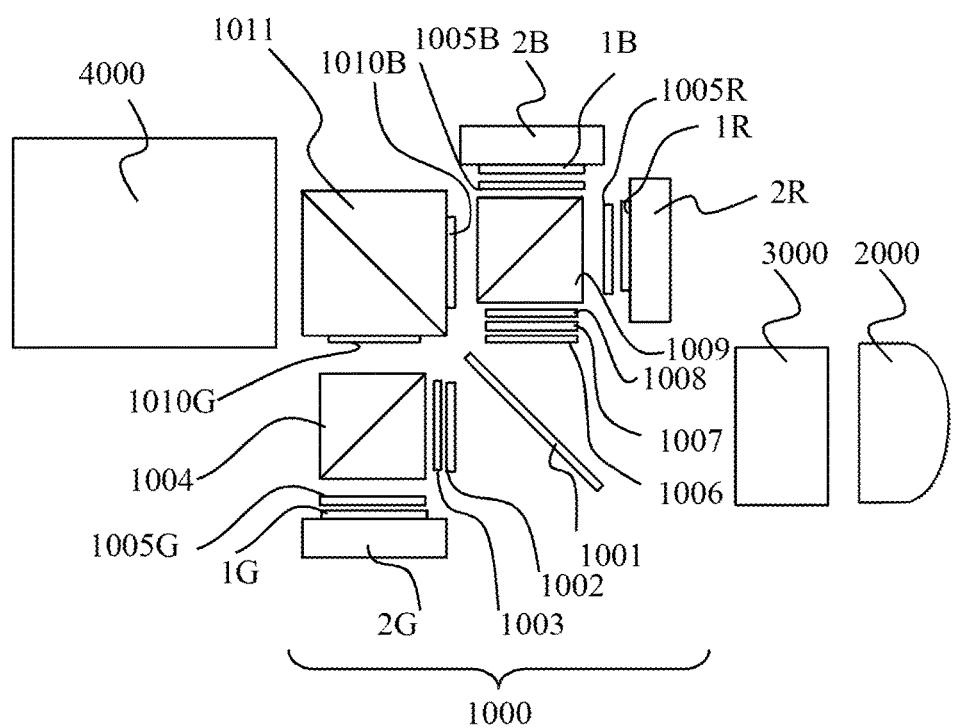
FIG. 4 illustrates an optical configuration of a projection according to the first embodiment.

The light modulation element 1 emits heat due to the absorption of the light energy from a light source unit 2000 illustrated in FIG. 4 and the self-consumed energy in the modulation driving. The light modulation element 1 changes its modulation characteristic when used at a temperature different from the set temperature set in the projector manufacturing process, and deteriorates the image quality because an image projected by the projector consequently contains flickers and black spots. In addition, when the temperature differences among the three light modulation elements 1 deviate from the predetermined temperature difference range, the image quality of the projected image deteriorates.

The heat emitted from the light modulation element 1 transmits to the jacket 2. The jacket 2 is cooled by the heat exchange with the coolant liquid 4 that flows in the jacket 2. Thereby, the light modulation element 1 is cooled. This cooling occurs in the three light modulation elements 1G, 1B, and 1R.

More specifically, the coolant liquid 4 pumped out from the pump 5 passes the temperature adjuster 3G, and enters the jacket 2G after the temperature adjuster 3 adjusts the temperature of the coolant liquid 4. The coolant liquid 4 that has received the heat from the jacket 2G next passes the temperature adjuster 3B, the temperature of the coolant liquid 4 is again adjusted by the temperature adjuster 3B, and the coolant liquid 4 enters the jacket 2B. The coolant liquid 4 that has received the heat from the jacket 2B next passes the temperature adjuster 3R, the temperature of the coolant liquid 4 is again adjusted by the temperature adjuster 3R, and the coolant liquid 4 enters the jacket 2R. The coolant liquid 4 that has received the heat from the jacket 2R again enters the temperature adjuster 3G via the tank 6 and the pump 5. The coolant liquid 4 circulates in this flow path, and the light modulation elements 1G, 1B, and 1R are individually cooled.

The temperature adjuster 3 can adjust through the Peltier element 31, the temperature of the coolant liquid 4 via the temperature transmitter 32 irrespective of the air temperature, and the temperature of the light modulation element 1 via the jacket 2. Thus, when the use environment temperature of the projector is higher than the set temperature of the light modulation element 1, the temperature of the light modulation element 1 can be adjusted to the set temperature.

Each of the jackets 2G, 2B, and 2R is arranged on the upstream side in the circulation direction of the temperature adjusters 3G, 3B, and 3R and on the downstream side of the other jackets, and thus the temperatures of the light modulation elements 1G, 1B, and 1R can be individually adjusted.

When each of a plurality of light modulation elements is provided with a jacket in the conventional liquid-cooling system, the circulating coolant liquid absorbs the heat from the upstream jacket and flows downstream. Therefore, the temperature of the downstream jacket is affected. However, the liquid-cooling system 100 according to this embodiment can individually adjust the temperatures of the temperature adjusters 3G, 3B, and 3R provided on the upstream sides of the jackets 2G, 2B, and 2R (light modulation elements 1G, 1B, and 1R). This configuration can restrain the modulation characteristic of the light modulation element 1 from fluctuating due to the temperature change and the image quality of the projected image from deteriorating.

On the other hand, when the operating environment temperature of the projector is low, or when an incident light amount is low on all or part of the plurality of light modulation elements 1 in a projected light quantity saving mode, all or part of the light modulation elements (specific light modulation element) 1 can be made warmer. For example, when the distributed light quantity to the light modulation element 1R is lower than those of the other light modulation elements 1G and 1B, the temperature of the light modulation element 1R is likely to be lower than those of the other light modulation elements 1G and 1B. In this case, the temperature adjuster 3R warms the light modulation element 1R via the jacket 2R, and adjusts the temperature of the light modulation element 1R to the set temperature.

Each temperature adjuster 3 adjusts the temperature of the corresponding light modulation element 1, and it is unnecessary for one temperature adjuster to adjust the temperature of a total heat amount of the plurality of light modulation elements as in the prior art. In other words, this embodiment provides the temperature adjuster 3 for each of the light modulation elements 1 so that a plurality of temperature adjusters 3 adjust the temperatures of the plurality of light modulation elements 1. As a result, the Peltier element 31 and the heat sink 33 in one temperature adjuster 3 can be made smaller and the liquid-cooling system 100 can be made smaller.

Figure 3:
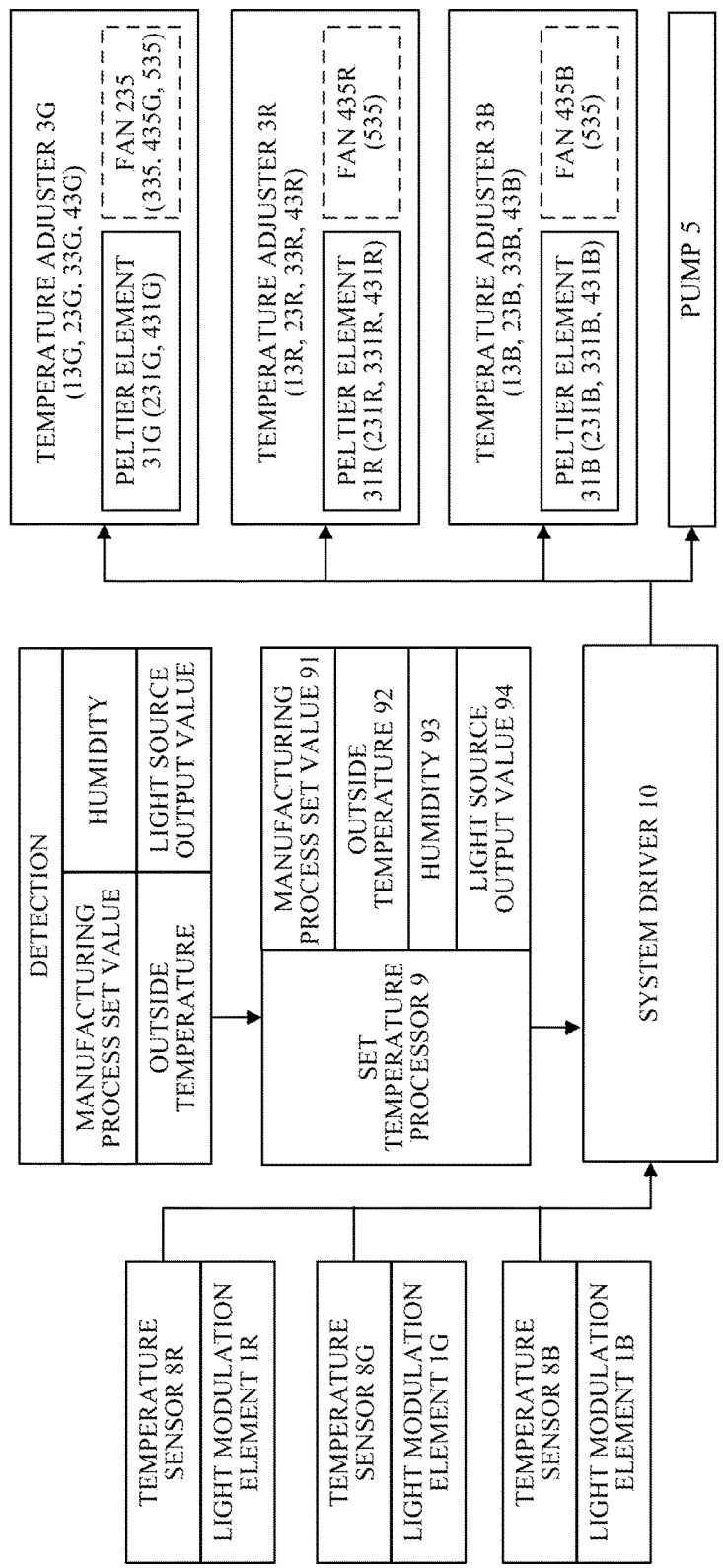
FIG. 3 is a block diagram of a configuration of a temperature control circuit according to the first embodiment.

Referring now to FIG. 3, a description will be given of the temperature control configuration for the liquid-cooling system 100 according to this embodiment. FIG. 3 illustrates the temperature control circuit configuration in the liquid-cooling system 100. Each of the light modulation elements 1R, 1G, and 1B includes a corresponding one of temperature sensors 8R, 8G, and 8B as a temperature detector. The temperatures of the light modulation elements 1R, 1G, and 1B detected by the temperature sensors 8R, 8G, and 8R are input to a system driver 10 as a controller. The system driver 10 controls the pump 5 and the temperature adjusters 3G, 3B, and 3R.

The set temperature processor 9 stores, in its internal memory, the optimal set temperature of each of the light modulation elements 1R, 1G, and 1B corresponding to a representative manufacturing process set value 91, an outside air temperature 92, a humidity 93, and a light source output value 94. The set temperature processor 9 reads out of the internal memory the optimal set temperatures of the light modulation elements 1R, 1G, and 1B corresponding to the detected manufacturing process set value, the outside air temperature, the humidity, and the light source output value, and sets a target set temperature through an interpolation calculation.

The system driver 10 calculates differences between the detected temperatures from the temperature sensors 8R, 8G, and 8B and the target set temperatures, and controls the temperature adjusters 3G, 3B, and 3R based on the temperature differences so that the detected temperatures from the temperature sensors 8R, 8G, and 8B approach to the target set temperatures. More specifically, the system driver 10 individually controls electrification amounts for the Peltier elements 31G, 31B, and 31R. For example, the system driver 10 may provide the Proportional Integral Differential (PID) control. This configuration can adjust the temperatures of the light modulation elements 1R, 1G, and 1B to the set temperatures, and restrain the image deterioration of the projected image.

Referring now to FIG. 4, a description will be given of the optical configuration of the projector using the liquid-cooling system 100 according to this embodiment. The light source unit 2000 includes a plurality of laser light sources as a solid light source, and a fluorescent body for a light wavelength conversion by using the light from the laser light sources as excited light. The laser light source can change its light output. The fluorescent body emits fluorescent light by converting a wavelength of part of incident excited light. The light source unit 2000 emits white light in which the light from the laser light sources and fluorescent light are combined with each other.

The light from the light source unit 2000 enters an illumination optical system 3000. The illumination optical system 3000 divides incident light into a plurality of light fluxes, combines them with each other, and forms uniform rectangular illumination areas on the light modulation elements 1R, 1G, and 1B, which will be described later.

The color separating/combining optical system 1000 includes a dichroic mirror 1001, a G half waveplate 1002, a G incident-side polarization plate 1003, a first polarization beam splitter 1004, a G quarter waveplate 1005G, an RB incident-side polarization plate 1006, a color selective phase difference plate 1007, a trimming filter 1008, a second polarization beam splitter 1009, a R quarter waveplate 1005R, a B quarter waveplate 1005B, a G exit-side polarization plate 1010G, a B exit-side polarization plate 1010B, and a dichroic prism 1011.

The dichroic mirror 1001 transmits the G component (referred to as "G light" hereinafter) in the white light from the illumination optical system 3000, and reflects the RB components (referred to as "RB light" hereinafter). The G light from the dichroic mirror 1001 passes the G half waveplate 1002 and G incident-side polarization plate 1003, enters the first polarization beam splitter 1004, is reflected by the first polarization beam splitter 1004, passes the G quarter waveplate 1005G, and enters the light modulation element 1G. The G light reflected and modulated by the light modulation element 1G passes the G exit-side polarization plate 1010G, and enters the dichroic prism 1011.

The RB light from the dichroic mirror 1001 passes the RB incident-side polarization plate 1006, and enters the color selective phase difference plate 1007. The color selective phase difference plate 1007 rotates the polarization direction of the B light component by 90° and does not rotate or maintains the polarization direction of the R light component. Moreover, the RB light passes the trimming filter 1008 that returns the orange light to the light source side so as to improve the color purity of the R light component, and enters the second polarization beam splitter 1009.

The R light component (referred to as "R light" hereinafter) in the RB light that has passed the trimming filter 1008 is reflected on the second polarization beam splitter 1009, passes the R quarter waveplate 1005R, and enters the light modulation element 1R. The R light reflected and modulated by the light modulation element 1R again passes the R quarter waveplate 1005R, passes the second polarization beam splitter 1009, passes the B exit-side polarization plate 1010B, and enters the dichroic prism 1011.

The B light component (referred to as "B light" hereinafter) in the RB light that has passed the trimming filter 1008 transmits the second polarization beam splitter 1009, passes the B quarter waveplate 1005B, and enters the light modulation element 1B. The B light reflected and modulated by the light modulation element 1B again passes the B quarter waveplate 1005B, is reflected by the second polarization beam splitter 1009, passes the B exit-side polarization plate 1010B, and enters the dichroic prism 1011.

The dichroic prism 1011 reflects the G light and transmits the R light and the B light. Thereby, the G light, the R light, and the B light are combined with one another and projected onto an illustrated target plane, such as a screen, via the projection lens 4000. Thus, the projected image is displayed.

In the thus-configured projector, the liquid-cooling system 100 that includes the jackets 2R, 2G, and 2B provided for the light modulators 1R, 1G, and 1B individually cools or warms the light modulators 1R, 1G, and 1B.

Second Embodiment

Figure 5:
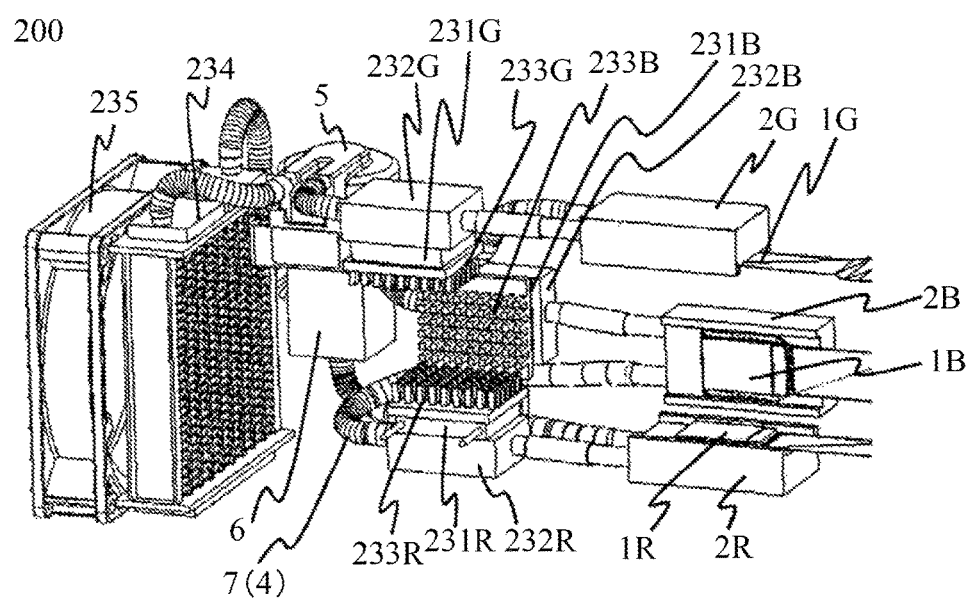
FIG. 5 is an overview of a configuration of a light modulation element liquid-cooling system in a projector according to a second embodiment of the present invention.
Figure 6:
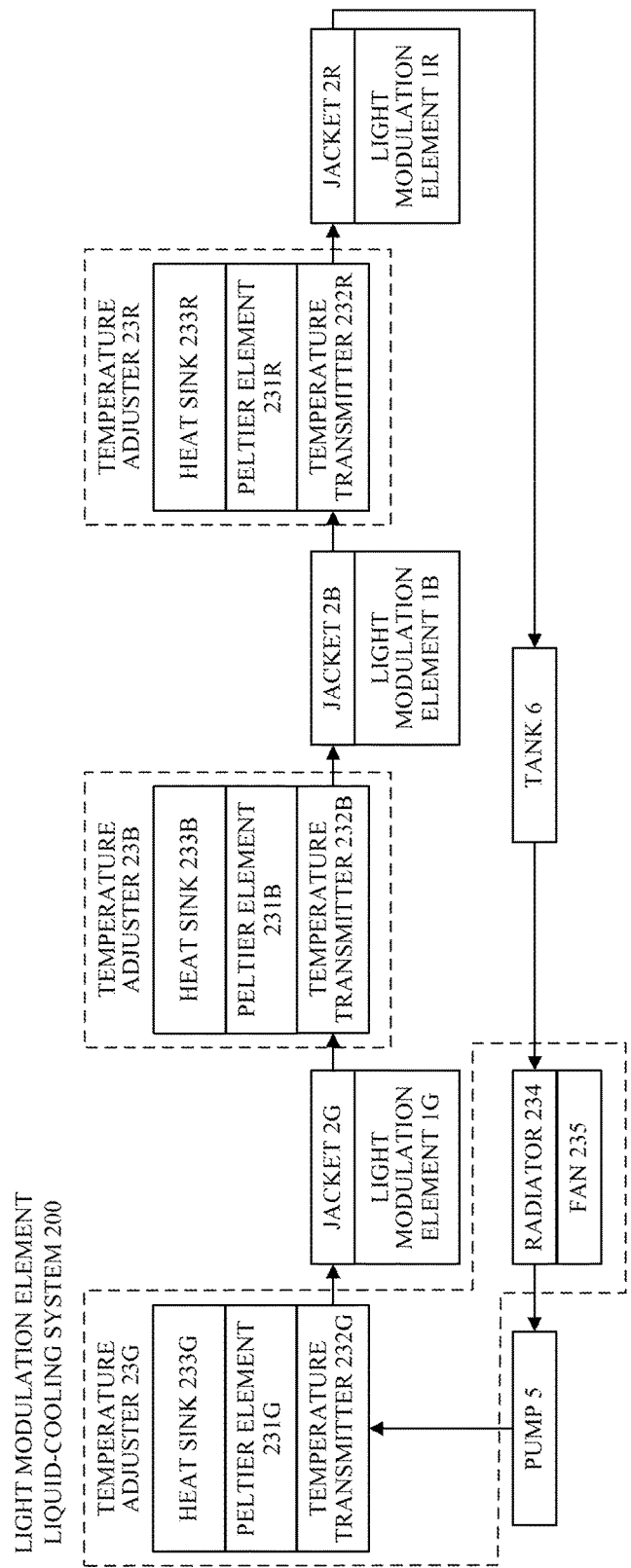
FIG. 6 is a block diagram of a configuration of the liquid-cooling system according to the second embodiment.

Referring now to FIGS. 5 and 6, a description will be given of a light modulation element liquid-cooling system 200 in a projector according to a second embodiment of the present invention. FIG. 5 illustrates an external appearance of the liquid-cooling system 200, and FIG. 6 illustrates a configuration of the liquid-cooling system 200. The optical configuration of the projector using the liquid-cooling system 200 is similar to that described in the first embodiment (FIG. 4).

In the liquid-cooling system 200, the light modulation elements 1G, 1B, and 1R and the jackets 2G, 2B, and 2R are the same as those described in the first embodiment. Temperature adjusters 23G, 23B, and 23R provided for the jackets 2G, 2B, and 2R adjust the temperature of the coolant liquid 4 that flows in the jackets 2G, 2B, and 2R similar to the temperature adjusters 3G, 3B, and 3R in the first embodiment. Similar to the first embodiment, the temperature adjusters 23G, 23B, and 23R include Peltier elements 231G, 231B, and 231R, temperature transmitters (first heat exchangers) 232G, 232B, and 232R, and heat sinks 233G, 233B, and 233R.

As described in the first embodiment, the temperature adjuster 23G corresponding to the light modulation element 1G having the largest heat amount in the light modulation elements 1 includes a radiator 234 (second heat exchanger) and a fan 235. The radiator 234 provides a heat exchange between the coolant liquid 4 and the atmospheric air. The fan 235 supplies the airflow to the radiator 234. The radiator 234 is provided on the upstream side of the Peltier element 231G and the temperature transmitter 232G in the temperature adjuster 23G.

In this embodiment, the coolant liquid 4 circulates in order of the pump 5, the temperature adjuster 23G (except the radiator 234), the jacket 2G, the temperature adjuster 23B, the jacket 2B, the temperature adjuster 23R, the jacket 2R, the tank 6, the radiator 234, and the pump 5 via the duct 7. The radiator 234 is provided between the tank 6 and the pump 5, and serves as part of the temperature adjuster 23G so as to adjust the temperature of the coolant liquid 4 flowing in the jacket 2G.

Even in this embodiment, in the circulation direction in which the coolant liquid 4 circulates in the flow path, each of the temperature adjusters 23G, 23B, and 23R corresponding to the jackets 2G, 2B, and 2R is provided on an upstream side of the corresponding jacket and on a downstream side of the other jackets. In other words, in the flow path, each of the temperature adjusters 23G, 23B, and 23B provided for the jackets is provided between the corresponding jacket and the other jacket. Moreover, in the circulation direction, the temperature adjusters 23G, 23B, and 23R, and the jackets 2G, 2B, and 2R are alternated so that the temperature adjuster is located on an upstream side of the corresponding jacket.

Even in this embodiment, similar to the first embodiment, the temperature adjusters 23G, 23B, and 23R can realize a small liquid-cooling system 200 (and projector) that can individually adjust the temperatures of the jackets 2G, 2B, and 2R or the light modulation elements 1G, 1B, and 1R, and can also warm a specific light modulation element 1.

Figure 7:
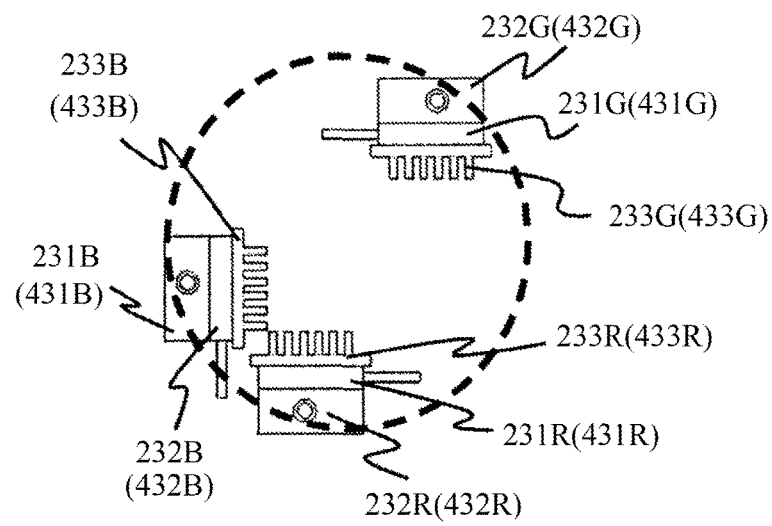
FIG. 7 is a block diagram of an arrangement of a heat sink in a temperature adjuster according to the second embodiment.

FIG. 7 illustrates an arrangement of the temperature adjusters 23G, 23B, and 23R in this embodiment. The temperature adjusters 23G, 23B, and 23R are arranged on a circle illustrated by a broken line, and the heat sinks 233G, 233B, and 233R are arranged so as to face the inside of the circle. This arrangement enables the airflow blown from the fan 235 and passing the radiator 234 to move along the heat sinks 233G, 233B, and 233R. This configuration can provide efficient heat exchanges between the heat sinks 233G, 233B, and 233R and the atmospheric air, and effectively miniaturize the cooling-air system 200. The airflow from the fan 235 is blown on the light modulation elements 1, the jackets 2, and optical members, such as a polarization plate and a waveplate, around the light modulation elements 1 so as to efficiently cool them and make small the projector.

FIG. 3 illustrates that the system driver 10 controls the number of rotations of the fan 235 while individually controlling an electrification amount in each of the Peltier elements 231G, 231B, and 231R in the temperature adjusters 23G, 23B, and 23R.

Third Embodiment

Figure 8:
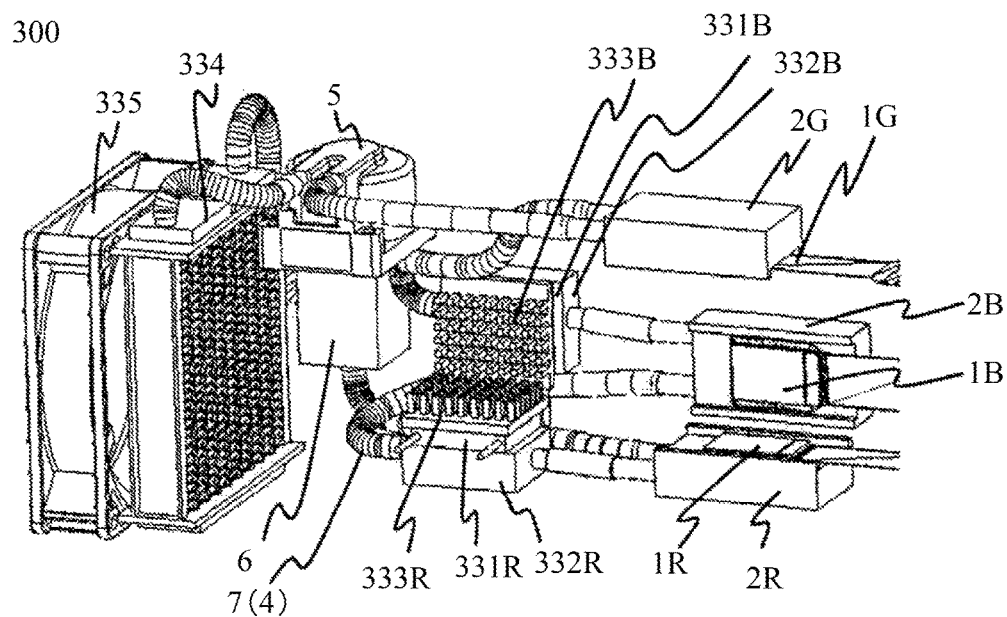
FIG. 8 is an overview of a configuration of a light modulation element liquid-cooling system in a projector according to a third embodiment of the present invention.
Figure 9:
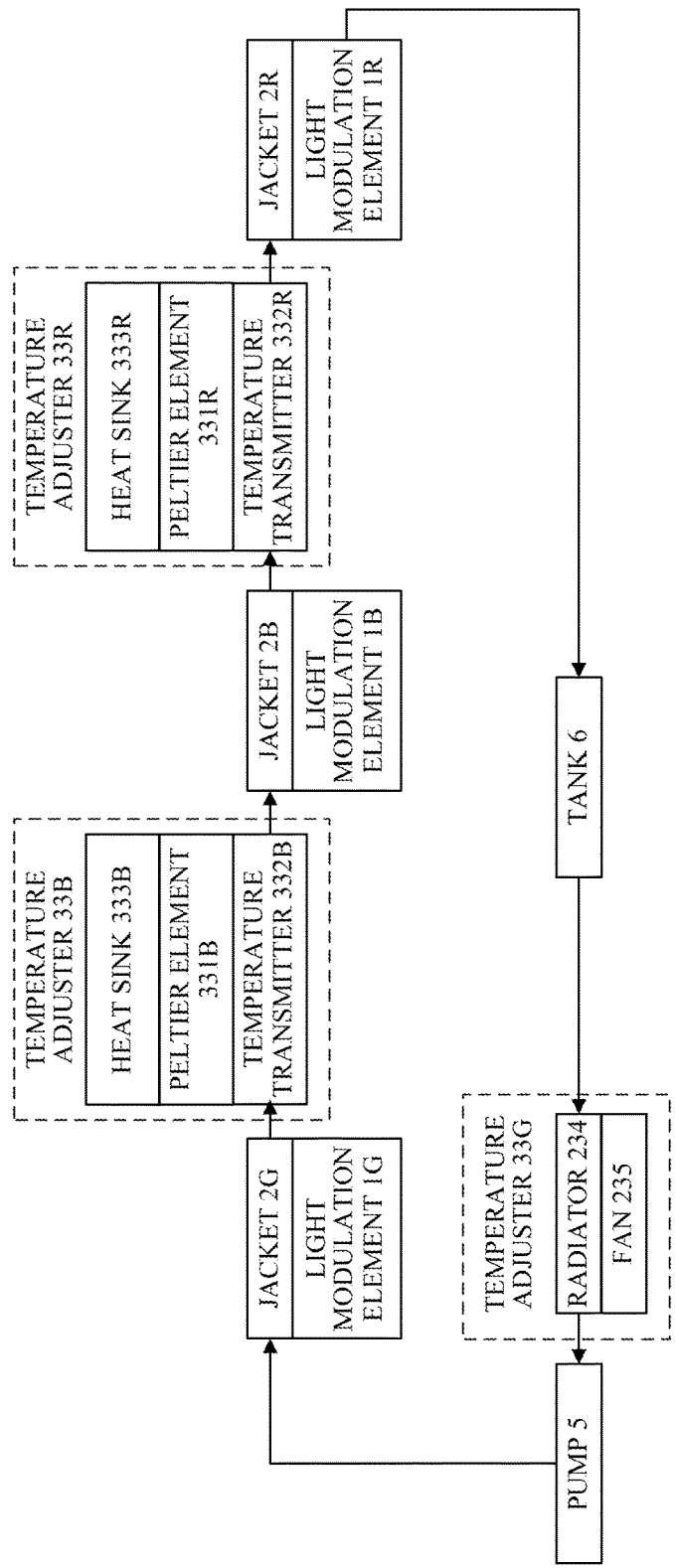
FIG. 9 is a block diagram of a configuration of the liquid-cooling system according to the third embodiment.

Referring now to FIGS. 8 and 9, a description will be given of a configuration of a light modulation element liquid-cooling system 300 in a projector according to a third embodiment of the present invention. FIG. 8 illustrates an external appearance of the liquid-cooling system 300, and FIG. 9 illustrates a configuration of the liquid-cooling system 300. The optical configuration of the projector using the liquid-cooling system 300 is similar to that described in the first embodiment (FIG. 4).

In the liquid-cooling system 300, the light modulation elements 1G, 1B, and 1R and the jackets 2G, 2B, and 2R are the same as those described in the first embodiment. Temperature adjusters 33G, 33B, and 33R provided for the jackets 2G, 2B, and 2R adjust the temperature of the coolant liquid 4 that flows in the jackets 2G, 2B, and 2R similar to the temperature adjusters 3G, 3B, and 3R in the first embodiment. Similar to the first embodiment, the temperature adjusters 33B and 33R include Peltier elements 331B and 331R, temperature transmitters (first heat exchangers) 332B and 332R, and heat sinks 333B and 333R.

The temperature adjuster 33G corresponding to the light modulation element 1G having the largest heat amount in the light modulation elements 1 includes a radiator 334 (second heat exchanger) and a fan 335 that supplies the airflow to the radiator 334. The radiator 334 is provided between the tank 6 and the pump 5.

In this embodiment, the coolant liquid 4 circulates in order of the temperature adjuster 33G, the pump 5, the jacket 2G, the temperature adjuster 33B, the jacket 2B, the temperature adjuster 33R, the jacket 2R, the tank 6, and the temperature adjuster 33G via the duct 7. The radiator 334 adjusts the temperature of the coolant liquid 4 that flows in the jacket 2G, and is provided between the tank 6 and the pump 5 on the upstream side of the jacket 2G in the circulation direction of the coolant liquid 4.

Even in this embodiment, in the circulation direction of the coolant liquid 4, each of the temperature adjusters 33G, 33B, and 33R corresponding to the jackets 2G, 2B, and 2R is provided on an upstream side of the corresponding jacket and on a downstream side of the other jackets. In other words, each of the temperature adjusters 33G, 33B, and 33B provided for the jackets is provided between the jacket corresponding to the temperature adjuster and the other jacket. Moreover, in the circulation direction, the temperature adjusters 33G, 33B, and 33R, and the jackets 2G, 2B, and 2R are alternated so that the temperature adjuster is located on an upstream side of the corresponding jacket.

Even in this embodiment, similar to the first embodiment, the temperature adjusters 33G, 33B, and 33R can realize a small liquid-cooling system 300 (and projector) that can individually adjust the temperatures of the jackets 2G, 2B, and 2R or the light modulation elements 1G, 1B, and 1R, and can also warm a specific light modulation element 1.

As understood from FIG. 8, this embodiment enables the airflow blown from the fan 335 and passing the radiator 334 to move along the heat sinks 333B and 333R. This configuration can provide efficient heat exchanges between the heat sinks 333B and 333R and the atmospheric air, and effectively miniaturize the liquid-cooling system 300. The airflow from the fan 335 is blown against the light modulation elements 1, the jackets 2, and optical components, such as a polarization plate and a waveplate, arranged around the light modulation elements 1 so as to efficiently cool them and make small the projector.

FIG. 3 illustrates that the system driver 10 controls the number of rotations of the fan 335 in the temperature adjuster 33G while individually controlling an electrification amount in each of the Peltier elements 331B and 331R in the temperature adjusters 33B and 33R.

Fourth Embodiment

Figure 10:
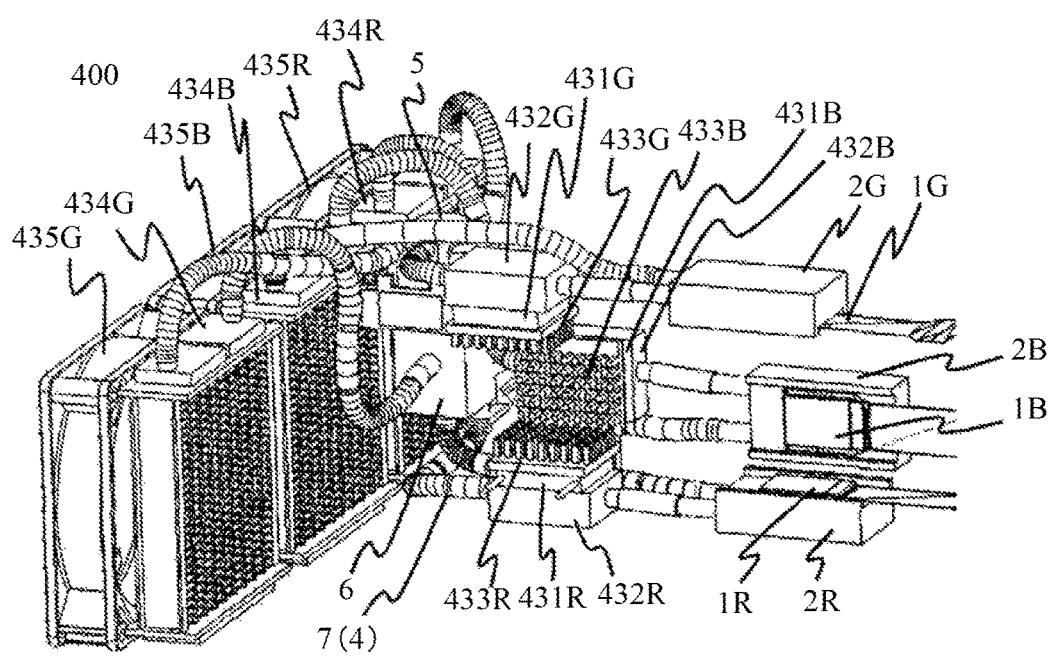
FIG. 10 is an overview of a configuration of a light modulation element liquid-cooling system in a projector according to a fourth embodiment of the present invention.
Figure 11:
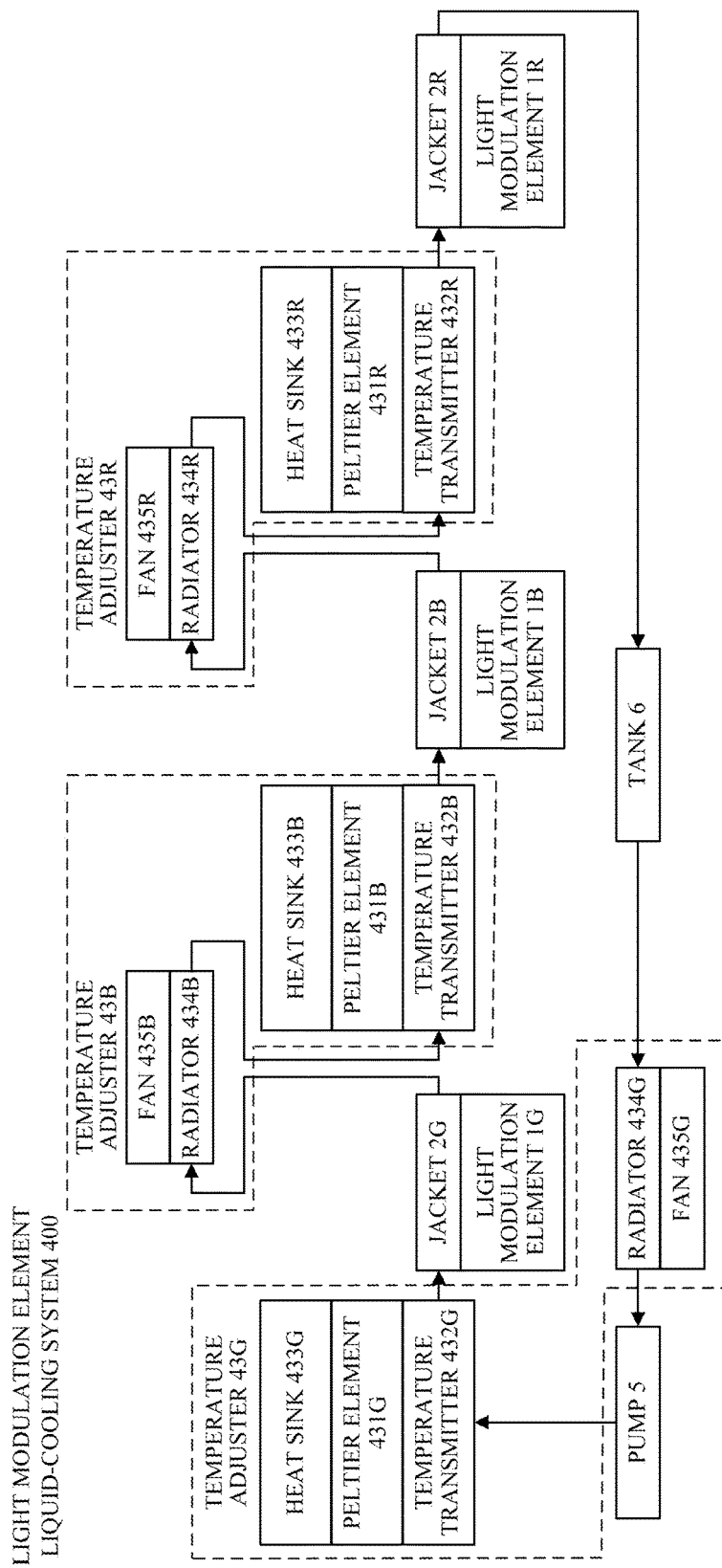
FIG. 11 is a block diagram of a configuration of the liquid-cooling system according to the fourth embodiment.

Referring now to FIGS. 10 and 11, a description will be given of a configuration of a light modulation element liquid-cooling system 400 in a projector according to a fourth embodiment of the present invention. FIG. 10 illustrates an external appearance of the liquid-cooling system 400, and FIG. 11 illustrates a configuration of the liquid-cooling system 400. The optical configuration of the projector using the liquid-cooling system 400 is similar to that described in the first embodiment (FIG. 4).

In the liquid-cooling system 400, the light modulation elements 1G, 1B, and 1R and the jackets 2G, 2B, and 2R are the same as those described in the first embodiment. Temperature adjusters 43G, 43B, and 43R provided for the jackets 2G, 2B, and 2R adjust the temperature of the coolant liquid 4 that flows in the jackets 2G, 2B, and 2R similar to the temperature adjusters 3G, 3B, and 3R in the first embodiment. The temperature adjusters 43G, 43B, and 43R include radiators (second heat exchangers) 434G, 434B, and 434R, and fans 435G, 435B, and 435R that supply the airflow to the radiators 434G, 434B, and 434R. The temperature adjusters 43G, 43B, and 43R include Peltier elements 431G, 431B, and 331R, temperature transmitters (first heat exchangers) 432G, 432B, and 432R, and heat sinks 433G, 433B, and 433R. The radiators 434G, 434B, and 434R and the fans 435G, 435B, and 435R are provided on the upstream side of the Peltier elements 431G, 431B, and 431R, and the temperature transmitters 432G, 432B, and 432R in the circulation direction of the coolant liquid 4. The radiator 434G of the temperature adjuster 43G is provided between the tank 6 and the pump 5.

The coolant liquid 4 circulates in order of the radiator 434G in the temperature adjuster 43G, the pump 5, the temperature transmitter 432G in the temperature adjuster 43G, the jacket 2G, the temperature adjuster 43B, the jacket 2B, the temperature adjuster 43R, the jacket 2R, the tank 6, and the radiator 434G in the temperature adjuster 43G via the duct 7.

Even in this embodiment, in the circulation direction of the coolant liquid 4, each of the temperature adjusters 43G, 43B, and 43R corresponding to the jackets 2G, 2B, and 2R is provided on an upstream side of the corresponding jacket and on a downstream side of the other jackets. In other words, each of the temperature adjusters 43G, 43B, and 43B provided for the jackets is provided between the jacket corresponding to the temperature adjuster and the other jacket. Moreover, in the circulation direction, the temperature adjusters 43G, 43B, and 43R, and the jackets 2G, 2B, and 2R are alternated so that the temperature adjuster is located on an upstream side of the corresponding jacket.

According to this embodiment, similar to the first embodiment, the temperature adjusters 43G, 43B, and 43R can realize a small liquid-cooling system 400 (and projector) that can individually adjust the temperatures of the jackets 2G, 2B, and 2R and the light modulation elements 1G, 1B, and 1R, and can also warm a specific light modulation element 1.

FIG. 7 illustrates an arrangement of the temperature adjusters 43G, 43B, and 43R in this embodiment. The temperature adjusters 43G, 43B, and 43R are arranged on a circle illustrated by a broken line, and the heat sinks 433G, 433B, and 433R are arranged so as to face the inside of the circle. This arrangement enables the airflow brown out of the fans 435G, 435B, and 435R, and passing the radiator 434G, 434B, and 434R to move along the heat sinks 433G, 433B, and 433R. This configuration can provide efficient heat exchanges between the heat sinks 433G, 433B, and 433R and the atmospheric air, and effectively miniaturize the cooling-air system 400. The airflow from the fans 435G, 435B, and 435R is blown against the light modulation elements 1, the jackets 2, and optical members, such as a polarization plate and a waveplate, around the light modulation elements 1 so as to efficiently cool them and make small the projector.

FIG. 3 illustrates that the system driver 10 controls the number of rotations of each of the fans 435G, 435B, and 435R while individually controlling an electrification amount in each of the Peltier elements 431G, 431B, and 431R.

Fifth Embodiment

Figure 12:
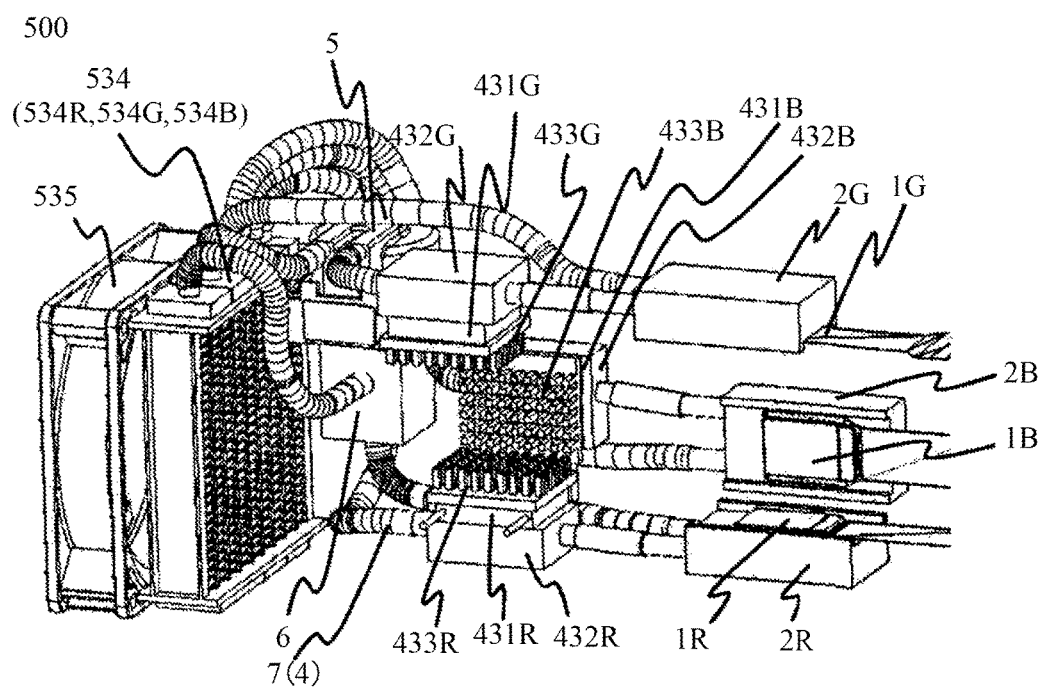
FIG. 12 is an overview of a configuration of a light modulation element liquid-cooling system in a projector according to a fifth embodiment of the present invention.
Figure 13:
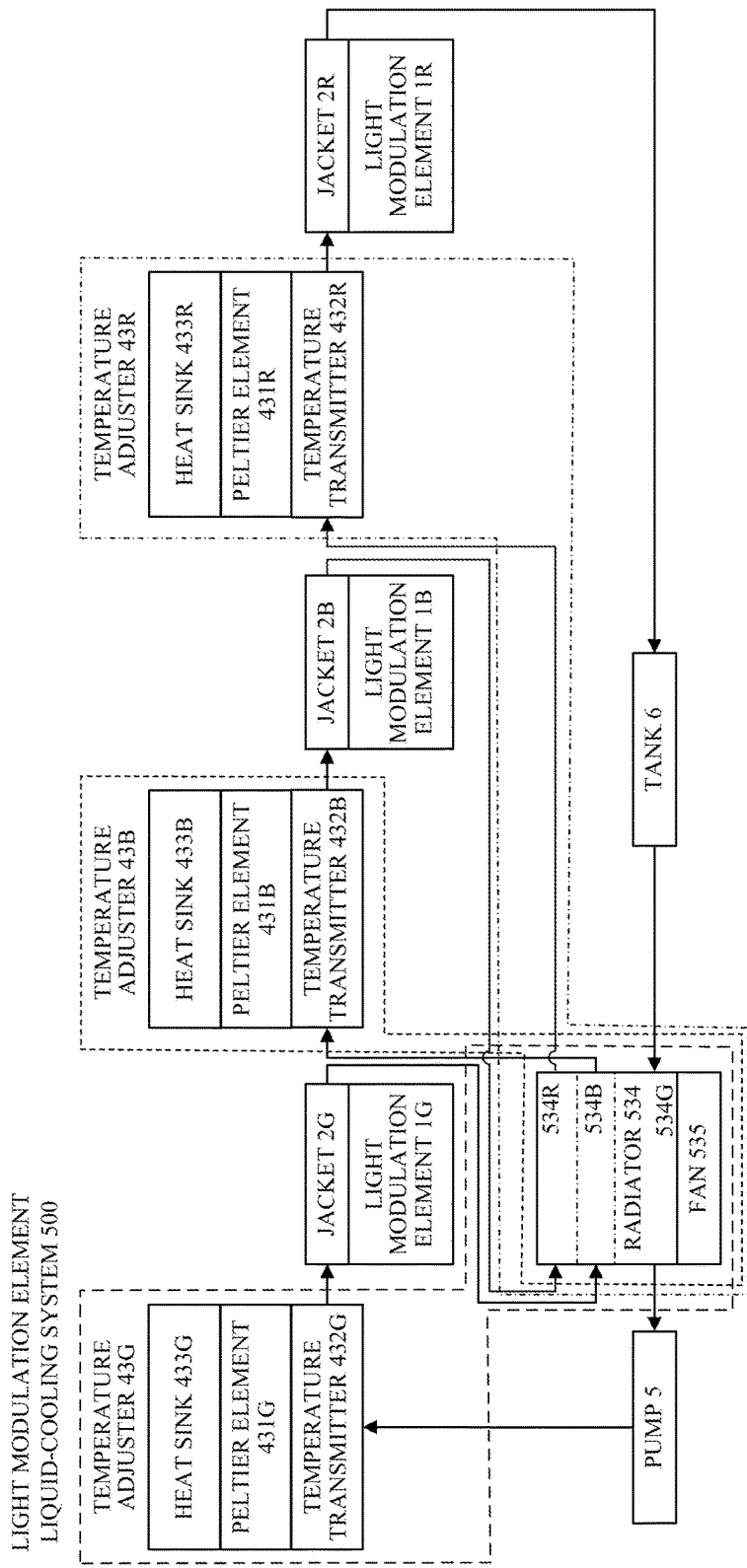
FIG. 13 is a block diagram of a configuration of the liquid-cooling system according to the fifth embodiment.

Referring now to FIGS. 12 and 13, a description will be given of a configuration of a light modulation element liquid-cooling system 500 in a projector according to a fifth embodiment of the present invention. This embodiment is a variation of the fourth embodiment. FIG. 12 illustrates an external appearance of the liquid-cooling system 500, and FIG. 13 illustrates a configuration of the liquid-cooling system 500. The optical configuration of the projector using the liquid-cooling system 500 is similar to that described in the first embodiment (FIG. 4).

In the liquid-cooling system 500, the light modulation elements 1G, 1B, and 1R and the jackets 2G, 2B, and 2R are the same as those described in the first embodiment. Temperature adjusters 43G, 43B, and 43R provided for the jackets 2G, 2B, and 2R adjust the temperature of the coolant liquid 4 that flows in the jackets 2G, 2B, and 2R similar to the temperature adjusters 43G, 43B, and 43R in the fourth embodiment. Similar to the fourth embodiment, the temperature adjusters 43G, 43B, and 43R include Peltier elements 431G, 431B, and 431R, temperature transmitters 432G, 432B, and 432R, and heat sinks 433G, 433B, and 433R. The temperature adjusters 43G, 43B, and 43R further include radiators 534 (534G, 534B, and 534R) as a single second heat exchanger shared by them, and the fan 535 for supplying the airflow to the radiator 534. The radiator 534G is provided between the tank 6 and the pump 5.

The coolant liquid 4 circulates in order of the radiator 534G, the pump 5, the temperature transmitter 432G, the jacket 2G, the radiator 534B, the temperature transmitter 432B, the jacket 2B, the radiator 534R, the temperature transmitter 432R, the jacket 2R, the tank 6, and the radiator 534G via the duct 7.

Even in this embodiment, in the circulation direction of the coolant liquid 4, each of the temperature adjusters 43G, 43B, and 43R corresponding to the jackets 2G, 2B, and 2R is provided on an upstream side of the corresponding jacket and on a downstream side of the other jackets. In other words, each of the temperature adjusters 43G, 43B, and 43B provided for the jackets is provided between the jacket corresponding to the temperature adjuster and the other jacket. Moreover, in the circulation direction, the temperature adjusters 43G, 43B, and 43R, and the jackets 2G, 2B, and 2R are alternated so that the temperature adjuster is located on an upstream side of the corresponding jacket.

According to this embodiment, similar to the first embodiment, the temperature adjusters 43G, 43B, and 43R can realize a small liquid-cooling system 500 (and projector) that can individually adjust the temperatures of the jackets 2G, 2B, and 2R and the light modulation elements 1G, 1B, and 1R, and can also warm a specific light modulation element 1.

FIG. 3 illustrates that the system driver 10 controls the number of rotations of the fan 535 while individually controlling an electrification amount in each of the Peltier elements 431G, 431B, and 431R.

In this embodiment, a G flow path (in order of the radiator 534G, the pump 5, the temperature transmitter 432G, and the jacket 2G) has more ducts 7 than B and R flow paths (in order of the radiators 534B and 534R, the temperature transmitters 432B and 432R, and the jackets 2B and 2R). Thus, as described in the first embodiment, this embodiment can efficiently adjust the temperature for the light modulation element 1G having the largest heat amount among the light modulation elements 1. In this case, the G flow path may be arranged at part having a large air quantity of the fan 535.

In this embodiment, three temperature adjusters 43G, 43B, and 43R share the radiator 534 but part (two) of temperature adjusters may share the radiator.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent configurations and functions.

For example, each of the above embodiments uses a reflection type liquid crystal element, but may apply a transmission type liquid crystal element for a light modulation element. A plurality of transmission type liquid crystal elements transmit light fluxes having different wavelengths and the light incident upon each transmission type liquid crystal element can be modulated based on an image signal.

More specifically, a description will be given of a configuration of a projector according to another embodiment having the transmission type liquid crystal panels and liquid-cooling system with reference to FIGS. 14 and 15.

Figure 14:
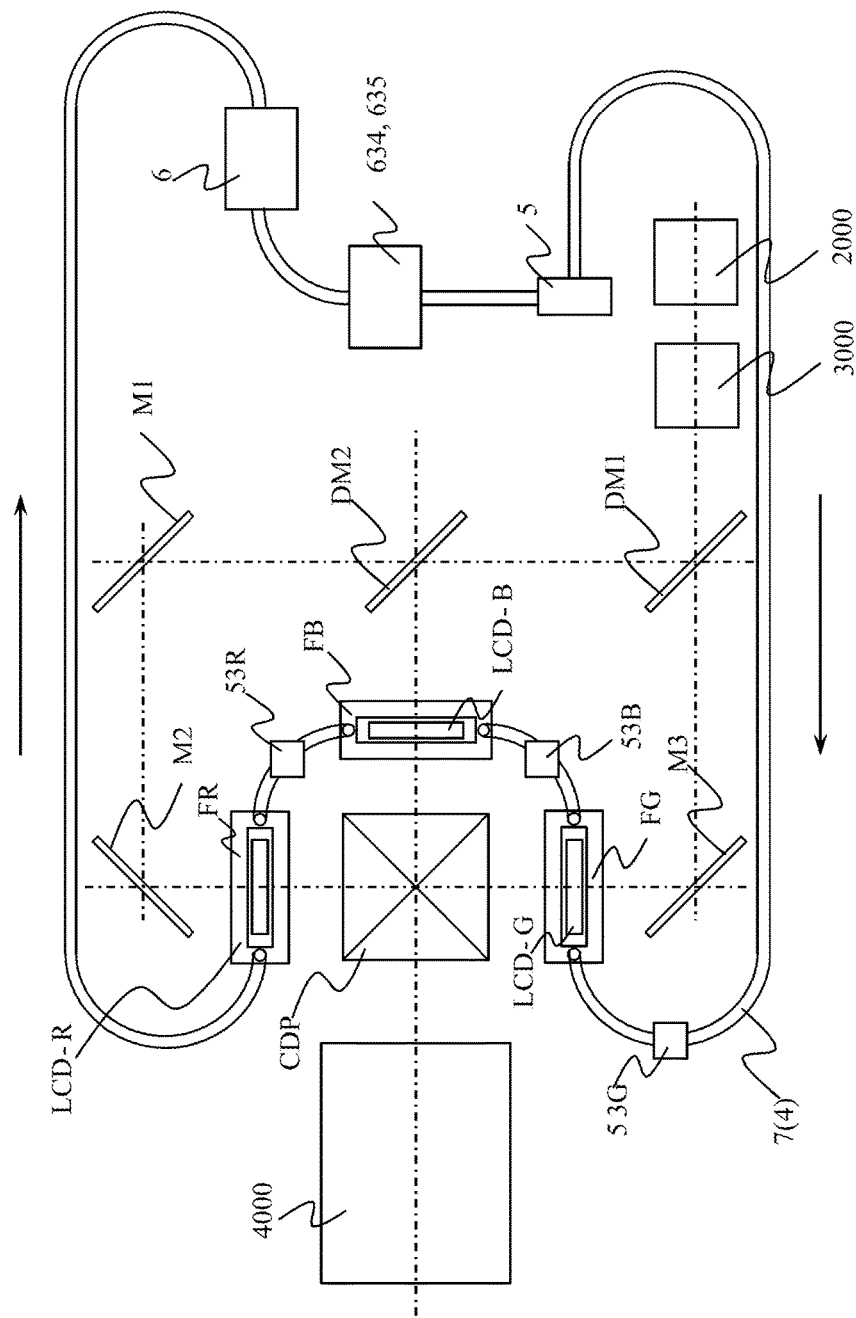
FIG. 14 illustrates an optical configuration of a projection according to another embodiment.
Figure 15:
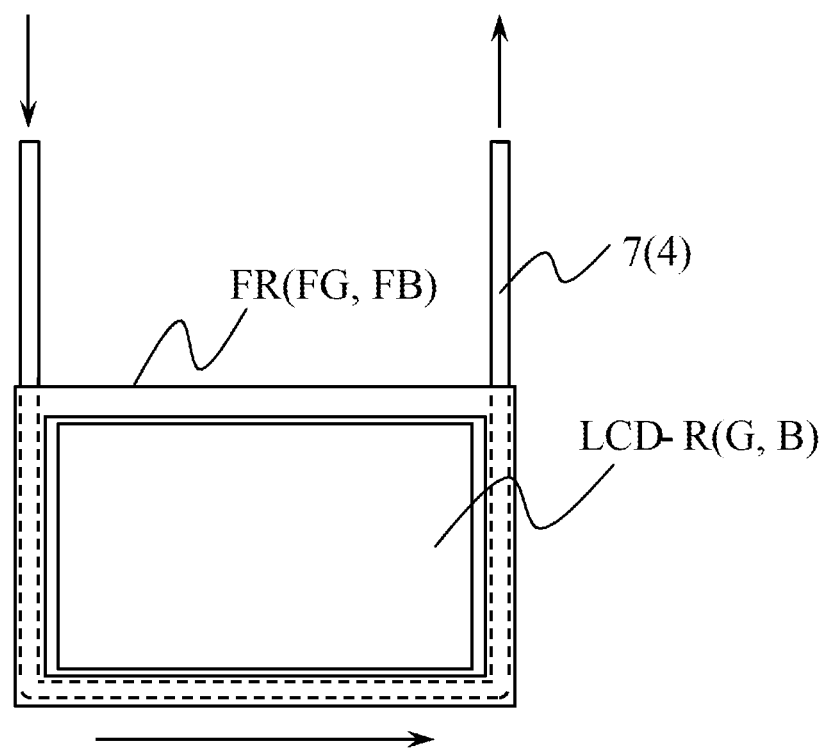
FIG. 15 illustrates a panel periphery of a liquid-cooling system according to the other embodiment.

FIG. 14 illustrates an optical configuration of the projector according to this embodiment and a configuration of the liquid-cooling system. The optical configuration will now be described. The white light from the light source unit 2000 is separated into blue light and red light that go to a dichroic mirror DM2 via a dichroic mirror DM1 and the illumination optical system 3000, and green light that goes to a mirror M3. As described above, the light source unit 2000 may include a laser light source and a fluorescent body, but may include a mercury lamp or an LD or LED that emits each color light. The illumination optical system 3000 includes an integrator optical system that has two fly-eye lenses or rod integrators, and a polarization conversion element.

The blue light from the dichroic mirror DM1 is reflected on the dichroic mirror DM2, enters a transmission type liquid crystal panel LCD-B for blue light, is modulated based on the image signal, and enters a cross dichroic prism CDP. The red light from dichroic mirror DM1 transmits the dichroic mirror DM2, enters a transmission type liquid crystal panel LCD-R for the red light via the mirrors M1 and M2, is modulated based on the image signal, and enters the cross dichroic prism CDP. The green light from the dichroic mirror DM1 enters a transmission type liquid crystal panel LCD-G for the green light via a mirror M3, is modulated based on the image signal, and enters the cross dichroic prism CDP. Each modulated color light combined by the cross dichroic prism CDP is projected onto the screen via a projection lens 4000. The optical configuration according to this embodiment has been thus described. Although unillustrated in FIG. 14, a lens that serves as a relay optical system or a field lens is provided between mirrors or on the front side of each transmission type liquid crystal panel.

Next follows a liquid-cooling system according to this embodiment. In FIG. 14, reference numerals 5 and 6 denote the pump and the tank as in each of the above embodiments. Reference numeral 634 denotes a radiator, and reference numeral 635 denotes a fan that cools the radiator 635. As illustrated in FIG. 15, the duct 7 is provided in frames FR, FG, and FB for holding each transmission type liquid crystal panel LCD-RGB. In each embodiment, each of the frames FR, FG, and FB is a heat receiver that provides heat exchanges with the light modulation elements and heat exchanges with the liquid. As illustrated in FIG. 14, this embodiment provides temperature adjusters 53RGB for each color light among the heat receivers. Similar to each of the above embodiments, each of the temperature adjusters 53RGB includes a heat sink, a Peltier element, and a temperature transmitter. Even in this embodiment, this configuration can individually maintain the temperature of each transmission type liquid crystal panel in an appropriate range.

This application claims the benefit of Japanese Patent Application No. 2017-049269, filed on Mar. 15, 2017, which is hereby incorporated by reference herein in its entirety.

What is claimed is:

1. An image projection apparatus configured to project light modulated by a plurality of light modulation elements and to display an image, the image projection apparatus comprising:
    a heat receiver provided to each of the plurality of light modulation elements, and to provide a heat exchange with the light modulation elements and a heat exchange with liquid;
    a temperature changer configured to change a temperature of the liquid that flows in the heat receiver;
    a pump configured to pump in and out the liquid; and
    a flow path configured to circulate the liquid among the pump, the temperature changer, and the heat receiver,
    wherein each temperature changer is provided for each heat changer and is provided between a corresponding heat receiver and another heat changer different from the corresponding heat receiver on the flow path.

2. The image projection apparatus according to claim 1, wherein the light modulation elements include a first light modulation element, a second light modulation element, a third light modulation element,
    wherein the heat receiver includes a first heat receiver provided for the first light modulation element, a second heat receiver provided for the second light modulation element, and a third heat receiver provided for the third light modulation element,
    wherein the temperature changer includes a first temperature changer provided for the first heat receiver, a second temperature changer provided for the second heat receiver, and a third temperature changer provided for the third heat receiver, and
    wherein the first temperature changer, the first heat receiver, the second temperature changer, the second temperature changer, the heat receiver, the third temperature changer, and the heat receiver are provided in this order in a circulation direction in which the liquid circulates on the flow path.

3. The image projection apparatus according to claim 1, wherein each temperature changer includes:
    a thermoelectric conversion element; and
    a first heat exchanger configured to provide a heat exchange between the thermoelectric conversion element and the liquid.

4. The image projection apparatus according to claim 1, wherein the temperature changer includes:
    a temperature changer that includes a thermoelectric conversion element, and a first heat exchanger configured to provide a heat exchange between the thermoelectric conversion element and the liquid; and
    a temperature changer that includes a thermoelectric conversion element, a first heat exchanger configured to provide a heat exchange between the thermoelectric conversion element and the liquid, and a second heat exchanger configured to provide a heat exchange between the liquid and outside air.

5. The image projection apparatus according to claim 1, wherein the temperature changer includes:
    a temperature changer that includes a thermoelectric conversion element, and a first heat exchanger configured to provide a heat exchange between the thermoelectric conversion element and the liquid; and
    a temperature changer that includes a second heat exchanger configured to provide a heat exchange between the liquid and outside air.

6. The image projection apparatus according to claim 1, wherein each temperature changer includes:
    a thermoelectric conversion element;
    a first heat exchanger configured to provide a heat exchange between the thermoelectric conversion element and the liquid; and
    a second heat exchanger configured to provide a heat exchange between the liquid and outside air.

7. The image projection apparatus according to claim 6, wherein at least part of the temperature changers share the second heat exchanger.

8. The image projection apparatus according to claim 3, wherein the temperature changer including the thermoelectric conversion element includes a heat exchange member configured to provide a heat exchange between the thermoelectric conversion element and outside air.

9. The image projection apparatus according to claim 1, wherein the plurality of light conversion elements reflect and modulate light beams having different wavelengths.

10. The image projection apparatus according to claim 1, wherein the plurality of light conversion elements transmit and modulate light beams having different wavelengths.

11. The image projection apparatus according to claim 1, further comprising:
 a temperature detector configured to detect each temperature of the plurality of light conversion elements; and
 a controller configured to control each temperature changer in accordance with the temperature detected by each of the plurality of light modulation elements.

* * * * *